(12) United States Patent
Doyon et al.

(10) Patent No.: US 11,209,261 B2
(45) Date of Patent: Dec. 28, 2021

(54) METHODS AND SYSTEMS FOR PRODUCING TRACEABLE MEASUREMENTS

(71) Applicant: INNOVMETRIC LOGICIELS INC., Québec (CA)

(72) Inventors: Louis-Jérôme Doyon, Quebec (CA); Marc Soucy, Quebec (CA)

(73) Assignee: INNOVMETRIC LOGICIELS INC., Quebec (CA)

( * ) Notice: Subject to any disclaimer, the term of this patent is extended or adjusted under 35 U.S.C. 154(b) by 0 days.

(21) Appl. No.: 16/548,124

(22) Filed: Aug. 22, 2019

(65) Prior Publication Data

US 2021/0055097 A1 Feb. 25, 2021

(51) Int. Cl.
| | |
|---|---|
| *G01B 11/02* | (2006.01) |
| *G06K 9/00* | (2006.01) |
| *G06T 19/00* | (2011.01) |
| *G06T 7/00* | (2017.01) |
| *G06T 7/62* | (2017.01) |

(52) U.S. Cl.
CPC ........ *G01B 11/022* (2013.01); *G06K 9/00671* (2013.01); *G06T 7/001* (2013.01); *G06T 7/62* (2017.01); *G06T 19/006* (2013.01)

(58) Field of Classification Search
CPC ....... G01B 11/022; G06T 19/006; G06T 7/62; G06T 7/001; G06K 9/00671
USPC ........................................................ 348/135
See application file for complete search history.

(56) References Cited

U.S. PATENT DOCUMENTS

| | | | |
|---|---|---|---|
| 7,564,469 B2 * | 7/2009 | Cohen | A63F 13/12 |
| | | | 345/632 |
| 9,342,743 B2 | 5/2016 | Vullioud et al. | |
| 9,633,481 B2 | 4/2017 | Persely | |
| 9,870,645 B2 | 1/2018 | Montaigne et al. | |

(Continued)

FOREIGN PATENT DOCUMENTS

| | | |
|---|---|---|
| WO | 2018035499 | 2/2018 |
| WO | 2018106289 | 6/2018 |
| WO | 20190152619 | 8/2019 |

OTHER PUBLICATIONS

Marposs, "Experience Augmented Reality Gauging With Marposs at IMTS 2018", Quality Digest, Jun. 27, 2018 https://www.qualitydigest.com/inside/innovation-news/experience-augmented-reaiity-gauging-marposs-imts-2018-062718.html.

(Continued)

*Primary Examiner* — Susan E. Hodges
(74) *Attorney, Agent, or Firm* — Norton Rose Fulbright Canada LLP

(57) ABSTRACT

Systems and methods for producing a traceable measurement of a component are provided. One or more augmented reality (AR) graphical elements, indicative of a measurement to be performed on the component using a local measurement instrument, are generated. The AR graphical elements are rendered via an AR device. One or more measurement values, associated with the measurement as performed on the component using the local measurement instrument, are obtained. An augmented image comprising a representation of the component, a representation of the local measurement instrument obtaining the measurement values, and a representation of the AR graphical elements is acquired. The measurement values are stored in association with the augmented image.

18 Claims, 5 Drawing Sheets

(56) References Cited

U.S. PATENT DOCUMENTS

| | | | |
|---|---|---|---|
| 10,467,534 B1* | 11/2019 | Brent | A61B 5/02 |
| 2002/0191002 A1 | 12/2002 | Friedrich et al. | |
| 2015/0049186 A1* | 2/2015 | Pettersson | G01B 11/005 |
| | | | 348/135 |
| 2015/0347849 A1* | 12/2015 | Vullioud | G02B 27/0101 |
| | | | 345/633 |
| 2016/0124501 A1 | 5/2016 | Lam et al. | |
| 2017/0256097 A1 | 9/2017 | Finn et al. | |
| 2018/0108178 A1 | 4/2018 | Murugappan et al. | |
| 2018/0286127 A1 | 10/2018 | Evertt et al. | |
| 2019/0033064 A1 | 1/2019 | Becker et al. | |
| 2019/0347860 A1* | 11/2019 | Steiner | G01B 11/002 |
| 2019/0355111 A1* | 11/2019 | Keene | G01N 29/043 |
| 2020/0134317 A1* | 4/2020 | Abe | G06K 9/00771 |

OTHER PUBLICATIONS

Wright, Ian, "What Can Augmented Reality Do for Manufacturing?", Engineering.com, May 11, 2017 https://www.engineering.com/AdvancedManufacturing/ArticleID/14904/What-Can-Augmented-Reality-Do-for-Manufacturing.aspx.

Anonymous "Use the Measure app on your iPhone or iPad—Apple Support", May 5, 2019 (May 5, 2019), XP055667583, Retrieved from the internet: URL: https://web.archive.org/web/20190505212642/https://support.apple.com/en-US/HT208924 [retrieved on Feb. 11, 2020].

BruceKenobi, "Ail Iron Man HUD Scenes (upto Civil War)", YouTube, Sep. 16, 2016 (Sep. 16, 2016), pp. 1-1, XP054980215, Retrieved from the internet: URL: https://www.youtube.com/watch?v=8-HYS456aZo [retrieved on Feb. 12, 2020].

* cited by examiner

METHODS AND SYSTEMS FOR PRODUCING TRACEABLE MEASUREMENTS

TECHNICAL FIELD

The improvements generally relate to the field of quality assurance, and more specifically to component inspection.

BACKGROUND

Manufacturing processes which aim to produce multiple substantially-identical components rely on inspection techniques to ensure consistent quality. Various types of inspection techniques are known. In some cases, a tool or instrument is brought into contact with a component to perform a measurement. In other cases, optical, ultrasonic, or other types of devices are used to inspect the component. Different instruments will provide measurements with different levels of precision, uncertainty, and the like, depending on the nature of the instrument.

In a manufacturing setting, it can occur that mandatory systematic or periodic inspection of components is required, for instance to ensure quality and to validate manufacturing processes. Operators can be provided with instruments with which to perform inspections, that is to say, with which to acquire one or more measurements. The measurements can be used to evaluate whether the component being inspected corresponds to established standards, and meets established quality guidelines. However, in many cases these inspections are entrusted to human operators, which can introduce additional uncertainty in the inspection process.

As a result, improvements are needed.

SUMMARY

In accordance with at least some broad aspects, there is provided method for producing a traceable measurement of a component. At least one augmented reality (AR) graphical element indicative of a measurement to be performed on the component using a local measurement instrument is generated. The at least one AR graphical element is rendered via an AR device. At least one measurement value associated with the measurement as performed on the component using the local measurement instrument is obtained. An augmented image comprising a representation of the component, a representation of the local measurement instrument obtaining the at least one measurement value, and a representation of the at least one AR graphical element is acquired. The measurement value is stored in association with the augmented image.

In some embodiments, the at least one AR graphical element is indicative of a measuring position and/or a measuring orientation for the local measurement instrument relative to the component.

In some embodiments, obtaining the at least one measurement value comprises obtaining the at least one measurement value from the local measurement instrument.

In some embodiments, obtaining the at least one measurement value comprises obtaining the at least one measurement value via an input device independent from the local measurement instrument.

In some embodiments, acquiring the augmented image comprises: monitoring a video feed obtained from the AR device configured for generating the at least one AR graphical element; and acquiring the augmented image when the local measurement instrument is located in a field of view of the AR device.

In some embodiments, acquiring the augmented image when the measurement instrument is located in a field of view of the AR device comprises acquiring the image based on an input from an operator.

In some embodiments, generating the at least one AR graphical element comprises: comparing a position and/or an orientation of the component with a virtual position and/or a virtual orientation associated with a virtual representation of the component.

In some embodiments, the rendering of the at least one AR graphical element via the AR device is performed responsive to determining that the position and/or orientation of the component corresponds to the virtual position and/or virtual orientation within a predetermined threshold.

In some embodiments, the virtual position and/or the virtual orientation is determined based on at least one target located on the component.

In some embodiments, the virtual position and/or the virtual orientation is adjustable in response to input from an operator.

In accordance with at least some other broad aspects, there is provided a system for producing a traceable measurement of a component, comprising a processor, and a non-transitory computer-readable medium having stored thereon instructions. The instructions are executable by the processor for: generating at least one augmented reality (AR) graphical element indicative of a measurement to be performed on the component using a local measurement instrument; rendering the at least one AR graphical element via an AR device; obtaining at least one measurement value associated with the measurement as performed on the component using the local measurement instrument; acquiring an augmented image comprising a representation of the component, a representation of the local measurement instrument obtaining the at least one measurement value, and a representation of the at least one AR graphical element; and storing the measurement value in association with the augmented image.

In some embodiments, the at least one AR graphical element is indicative of a measuring position and/or a measuring orientation for the local measurement instrument relative to the component.

In some embodiments, obtaining the at least one measurement value comprises obtaining the at least one measurement value from the local measurement instrument.

In some embodiments, obtaining the at least one measurement value comprises obtaining the at least one measurement value via an input device independent from the local measurement instrument.

In some embodiments, acquiring the augmented image comprises: monitoring a video feed obtained from the AR device configured for generating the at least one AR graphical element; and acquiring the augmented image when the local measurement instrument is located in a field of view of the AR device.

In some embodiments, acquiring the augmented image when the measurement instrument is located in a field of view of the AR device comprises acquiring the image based on an input from an operator.

In some embodiments, generating the at least one AR graphical element comprises: comparing a position and/or an orientation of the component with a virtual position and/or a virtual orientation associated with a virtual representation of the component.

In some embodiments, the rendering of the at least one AR graphical element via the AR device is performed responsive to determining that the position and/or orientation of the component corresponds to the virtual position and/or virtual orientation within a predetermined threshold.

In some embodiments, the virtual position and/or the virtual orientation is determined based on at least one target located on the component.

In some embodiments, the virtual position and/or the virtual orientation is adjustable in response to input from an operator.

Features of the systems, devices, and methods described herein may be used in various combinations, in accordance with the embodiments described herein.

BRIEF DESCRIPTION OF THE DRAWINGS

Further features and advantages of embodiments described herein may become apparent from the following detailed description, taken in combination with the appended drawings, in which.

DETAILED DESCRIPTION

Inspection of components, for instance in manufacturing settings, is typically performed by human staff (hereinafter referred to as "operators"). Operators are provided with various inspection tools with which to perform inspection. These can include various gauges, for instance calipers, micrometers, thermometers, radius gauges, and the like, which can be used to measure various geometrical quantities, including diameter, length, thickness, gap (or spacing), flushness, etc., and various non-geometrical quantities, including temperature, pressure, roughness, strain, etc.

Figure 1:
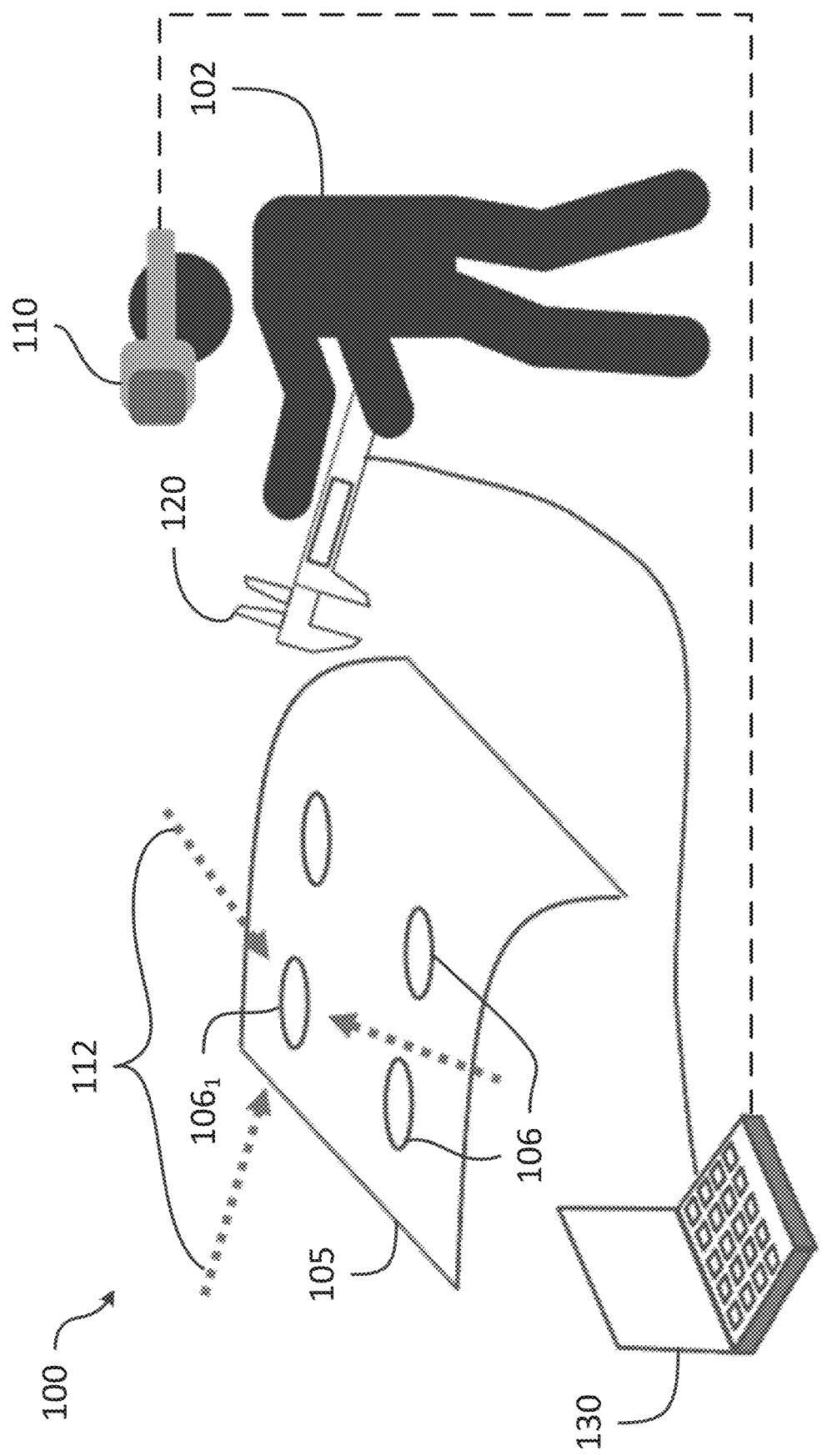
FIG. 1 is a schematic diagram of an example inspection procedure.

With reference to FIG. 1, a schematic diagram of an example inspection procedure 100 is shown. The inspection procedure 100 is performed by an operator 102, who may be tasked with inspecting a component 105 using a measurement instrument 120 (hereinafter "instrument"). The component 105 can be any suitable type of part, piece, or element, and can be made of any suitable material. The component 105 can have multiple features 106, which can be openings, projections, cavities, curves, planes, and the like. The inspection instrument 120 can be any suitable type of tool or device for performing a measurement of the component 105. In some embodiments, the instrument 120 is an analog device, which produces a reading on an analog gauge or scale. In some other embodiments, the instrument 120 is a digital device, which produces a reading on a screen or other display. The instrument 120 is generally considered to be a so-called "local" device—that is to say, a device which measures a physical quantity on the component 105 without any knowledge of its own physical location in three-dimensional space. Other types of instruments are also considered.

In some embodiments, the operator 102 is provided with an augmented reality (AR) device 110, which can be worn on a head, or part of the head, of the operator 102. The AR device 110 includes a display which can superimpose virtual elements over the field of view of the operator 102. For instance, the AR device 110 can generate AR graphical elements 112 which indicate to the operator 102 that feature $106_1$ of component 105 is to be inspected. The AR device 110 can be any suitable type of AR device, including, but not limited to, an AR headset, AR glasses or goggles, an AR visor, AR contact lenses, or the like. The AR device 110 can be provided with various sensors, including, but not limited to, one or more inclinometers, accelerometers, compasses, scanners, cameras, and the like. The AR device 110 can sense, or alternatively communicate with, one or more beacons to assess the position of the AR device 110 in 3D space.

In some embodiments, operation of the AR device 110 can be controlled by way of a computing system 130, which can be coupled to the AR device 110 via any suitable wired or wireless means. The computing system 130 can have stored thereon various instructions for acquiring measurements from the component 105, for instance for the feature $106_1$ of the component 105. The measurements may be associated with instructions indicative of the manner in which the measurement should be performed, and with AR graphical elements for presentation to the operator 102 via the AR device 110, for instance the AR graphical elements 112. In other embodiments, the AR device 110 can be self-contained, and have stored therein the instructions for acquiring measurements and the AR graphical elements 112 for presentation.

For example, the operator 102 can consult the computing system 130 and/or the AR device 110 to determine what measurements are to be performed on the feature $106_1$ of the component 105. The AR device 110 can present one or more AR graphical elements 112 which indicate to the operator 102 that the feature $106_1$ is to be measured. The AR device 110 and/or the computing system 130 can optionally present additional instructions, which can relate to the manner in which the inspection is to be performed, the instrument to be used, and the like. The operator 102 can then use the instrument 120 to perform the measurement on the feature $106_1$, and record the value of the measurement.

In order to improve traceability of measured values, it is considered that the AR device 110 can be used to capture an image of the component 105, for instance of the feature $106_1$, as the measurement of the feature $106_1$ is being taken by the operator 102, and augment the image with one or more of the AR graphical elements 112 as seen by the operator 102 via the AR device 110. For instance, the AR device 110 can capture an augmented image of part or all of the component 105 at the time the operator 102 is performing the measurement, the instrument 120 and the AR graphical elements 112 being visible in the captured image. Put differently, the AR device 110 captures an augmented image which contains a representation of the component 105 and/or of one or more features 106, a representation of the measurement instrument 120 as the at least one measurement value is being obtained, and a representation of the AR graphical elements 112. In this fashion, the augmented image can be used to validate that the operator 102 performed the measurement adequately, and can be used to assess possible sources of failure in the event that the measurement was improperly taken.

Figure 2:
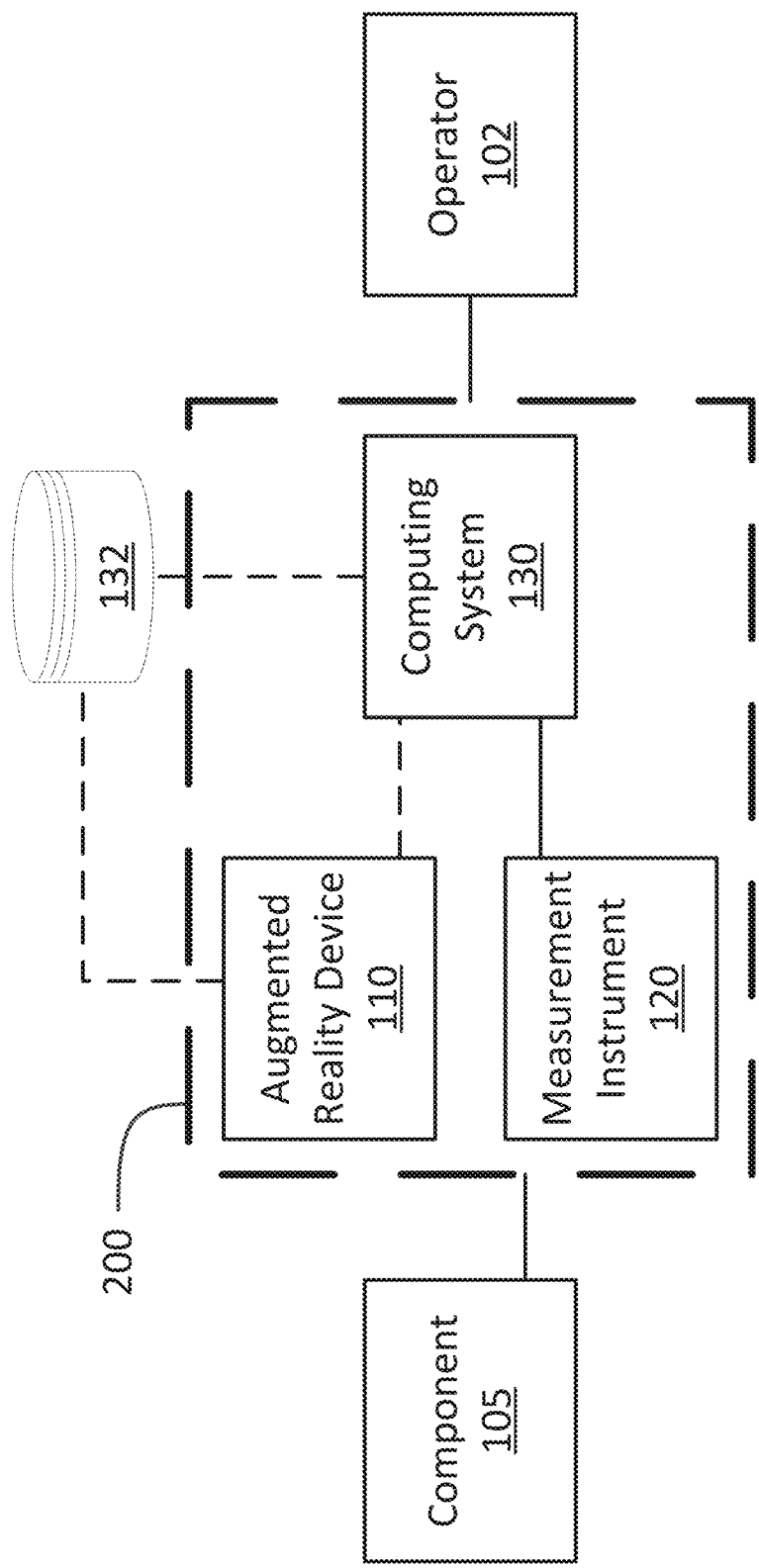
FIG. 2 is a block diagram of an example inspection system, in accordance with at least some embodiments.

With reference to FIG. 2, an inspection system 200 is illustrated. The inspection system 200 is composed of the AR device 110, the instrument 120, and the computing system 130. The inspection system 200 can be used by the operator 102 to perform inspection of the component 105. In some embodiments, the operator 102 makes use of each of the elements of the inspection system 200; in some other embodiments, the operator 102 makes use of the instrument 120 and the AR device 110.

The inspection system 200 is configured for generating one or more AR graphical elements, for instance the AR graphical elements 112, indicative of a measurement to be performed on the component 105, for instance using the instrument 120. The AR graphical elements 112 can be a set of instructions and/or graphics which, when displayed via the AR device 110, provide indications to the operator 102 regarding the measurement to be performed, the manner in which the measurement should be performed, the instrument 120 which should be used, and the like. For example, the AR graphical elements 112 can indicate (e.g., using arrow(s) or any other suitable indicator) a position and/or an orientation for the instrument 120. In some embodiments, the AR graphical elements 112 are stored within the computing system 130, or within a data repository connected thereto. In other embodiments, the AR graphical elements 112 are stored within the AR device 110 itself, or within a data repository connected thereto. The inspection system 200 can be provided with any suitable number of AR graphical elements 112, which can be associated with different measurements to be performed on the component 105. In some embodiments, the inspection system 200 is configured for personalizing the AR graphical elements 112 to particular preferences of the operator 102. For example, if the operator 102 is colourblind, the particular colours with which the AR graphical elements 112 are displayed via the AR device 110 can be varied for the operator 102. Other types of personalization are also considered.

The inspection system 200 can also display the AR graphical elements 112, for instance via the AR device 110. In some embodiments, the AR graphical elements 112 are displayed in response to an input received from the operator 102. In some other embodiments, the AR graphical elements 112 are displayed in response to an external trigger. For example, the AR device 110 can monitor the field of view of the operator 102 using one or more cameras, and when the component 105, or a particular feature 106 thereof, comes into view, the AR device 110 can automatically display the AR graphical elements. In another example, when the component 105, or a particular feature 106 thereof, comes into view, the AR device 110 can list a number of different measurements to be taken by the operator 102. The operator 102 can select (e.g., via a suitable input device communicatively coupled to the AR device 110) one of the measurements from the list, and the AR device 110 can then display the associated AR graphical elements. In some further embodiments, the AR graphical elements 112 can be displayed based on a timer. If the operator 102 is known to perform a plurality of measurements in a predetermined amount of time, or if a predetermined amount of time is allocated to the operator 102 to perform the measurements, the AR device 110 can successively display different AR graphical elements 112 based on a timer. Other approaches are also considered.

In some embodiments, the AR device 110 can display to the operator 102 a virtual version of the component 105, or of the feature 106$_1$, and the operator 102 can displace the virtual version of the component 105 or feature 106$_1$ to align with the actual component 105 or feature 106$_1$. The AR device 110 can also perform some fine-tuning of the position of the virtual component 105 or feature 106$_1$, based on various image recognition algorithms. The AR device 110 can use the position and/or orientation of the virtual component 105 or feature 106$_1$, once set, as a reference for displaying the AR graphical elements 112.

In another embodiment, the component 105, the features 106, and/or the instrument 120 are provided with targets which are detectable by the AR device 110. The targets can be used to assist the AR device 110 in aligning the virtual version of the component 105 and/or the features 106 with the actual component 105 and/or features 106 within the field of view of the operator 102. This can ensure that the AR graphical elements 112 presented to the operator are properly aligned. The targets can be any suitable visible symbol or device which can be detected by the AR device. In still other embodiments, model-based tracking technologies are used to align the virtual version of the component 105 and/or the features 106 with the actual component 105 and/or the features 106. In some embodiments, alignment of the virtual and actual component 105 and/or the features 106 is based on aligning a coordinate system for the component 105 with a virtual coordinate system for the AR device 110, which can be associated with the virtual component 105 and/or the features 106.

The inspection system 200 is configured for obtaining a measurement value associated with the measurement to be performed on the component 105. The measurement value can be obtained, for example, from the instrument 120, which can be communicatively coupled to the computing system 130 using wired or wireless communication techniques. Alternatively, or in addition, the measurement value can be input by the operator 102 into the computing system 130, for example via an input device, which can be a keyboard, a mouse or other pointing device, a touchscreen, a voice recognition system, or any other suitable input device.

The inspection system 200 is configured for acquiring an image, for example via the AR device 110, which contains an indication of behaviour of the operator 102 consistent with performing the measurement to acquire the measurement value, and which is augmented with one or more of the AR graphical elements 112. In some embodiments, the AR device 110 monitors a video feed or other stream of image data obtained via one or more cameras to identify when the operator 102 is performing the measurement on the component 105. When the AR device 110 detects that the operator 102 is performing the measurement, the AR device 110 can capture an augmented image which is indicative of the operator 102 performing the measurement. The AR device 110 can use various image recognition techniques to identify the behaviour of the operator 102 which is consistent with performing the measurement. For example, the AR device 110 can compare a position and/or an orientation of the instrument 120 with a known reference position and/or orientation associated with the measurement. When the instrument 120 is located in a position and/or orientation substantially consistent with the reference position and/or orientation, the AR device 110 can capture an augmented image which shows the operator 102 performing the measurement. In another example, the component 105 and/or the instrument 120 are provided with one or more targets affixed thereto, which can be detected by the AR device 110. When a sufficient number of targets are located in the field of view of the operator 102, or are visible by cameras of the AR device 110, the AR device can capture an augmented image which shows the operator 102 performing the measurement. Other approaches, including model-based tracking technology, are considered.

In some other embodiments, the AR device 110 captures the augmented image based on a request from the operator 102. For example, the operator 102 can signal that they are performing the measurement via an input device based on which the AR device 110 can capture the augmented image which shows the operator 102 performing the measurement. The input device can be located on the instrument 120, the AR device 110, or a separate dedicated component in communication with the AR device 110. Alternatively, the input device can be communicatively coupled to the computing system 130, which can then communicate to the AR device 110 that the augmented image should be captured. In another example, the operator 102 can use a spoken voice command, which can be recognized by the AR device 110 and/or the computing device 130, based on which the AR device can capture the augmented image.

Other approaches by which the operator 102 can signal to the AR device 110, including via the computing system 130, that an augmented image indicative of the operator 102 performing the measurement should be captured are considered.

In some other embodiments, the AR device 110 and the computing system 130 are not communicatively coupled to one another, and the computing system 130 can acquire the augmented image via a data repository to which both the AR device 110 and the computing system 130 are coupled, for instance a database 132. The AR device 110 can be configured for acquiring augmented images and storing them in the database 132, and the computing system 130 can thereafter access the database 132 to acquire the augmented images captured by the AR device 110. Other approaches are also considered.

The inspection system 200 is configured for storing the measurement value obtained by the operator in association with the augmented image acquired by the AR device 110. In some embodiments, the instrument 120 provides the measurement value to the computing system 130, and the AR device 110 provides the augmented image to the computing system 130, which then stores the measurement value in association with the augmented image. In some other embodiments, the operator provides the measurement value to the computing system 130, for instance via the aforementioned input device, and the computing system 130 can obtain the augmented image from the AR device 110, or from a data repository coupled thereto. The measurement value and augmented image can be stored in any suitable type of data repository, for instance the database 132, which can be coupled to the computing system 130 in any suitable fashion, and can be local to the computing system 130, or can be remotely accessible thereby.

In some embodiments, the measurement value is also stored with various metadata, including a time at which the measurement and/or the augmented image were acquired, a geographical location at which the measurement and/or the augmented image were acquired, an identifier associated with the operator 102 who performed the measurement, an identifier associated with the AR device 110 which acquired the augmented image, and the like.

The measurement value and the associated augmented image can be accessed at any suitable time after the measurement is performed by the operator 102, in order to assess the validity of the measurement. Because the augmented image is indicative of operator behaviour when the measurement was performed and of the AR graphical elements 112 which the operator 102 saw when performing the measurement, the validity of the measurement can be assessed to determine whether established protocols for measurements were correctly applied, or when investigating non-conformities in a manufacturing or assembly setting.

Although the foregoing discussion focused primarily on the notion of acquiring an augmented image, it should be noted that in certain embodiments, the AR device 110 can capture a plurality of augmented pictures, an augmented video segment of any suitable length, or any other suitable visual information which is indicative of the operator 102 performing the measurement to acquire the measurement value and which is augmented with the AR graphical elements 112. In some embodiments, the instrument 120 is configured for producing an alert or other audible cue when a predetermined value is met, or based on other conditions. In such cases, the AR device 110 can capture a video segment which includes an audio portion, for instance to capture the audible cue produced by the instrument. In addition, the augmented images or video segment acquired by the AR device 110 include various metadata, including time of capture, GPS coordinates or other location information, an indication of the user operating the AR device 110, and the like.

Figure 3:
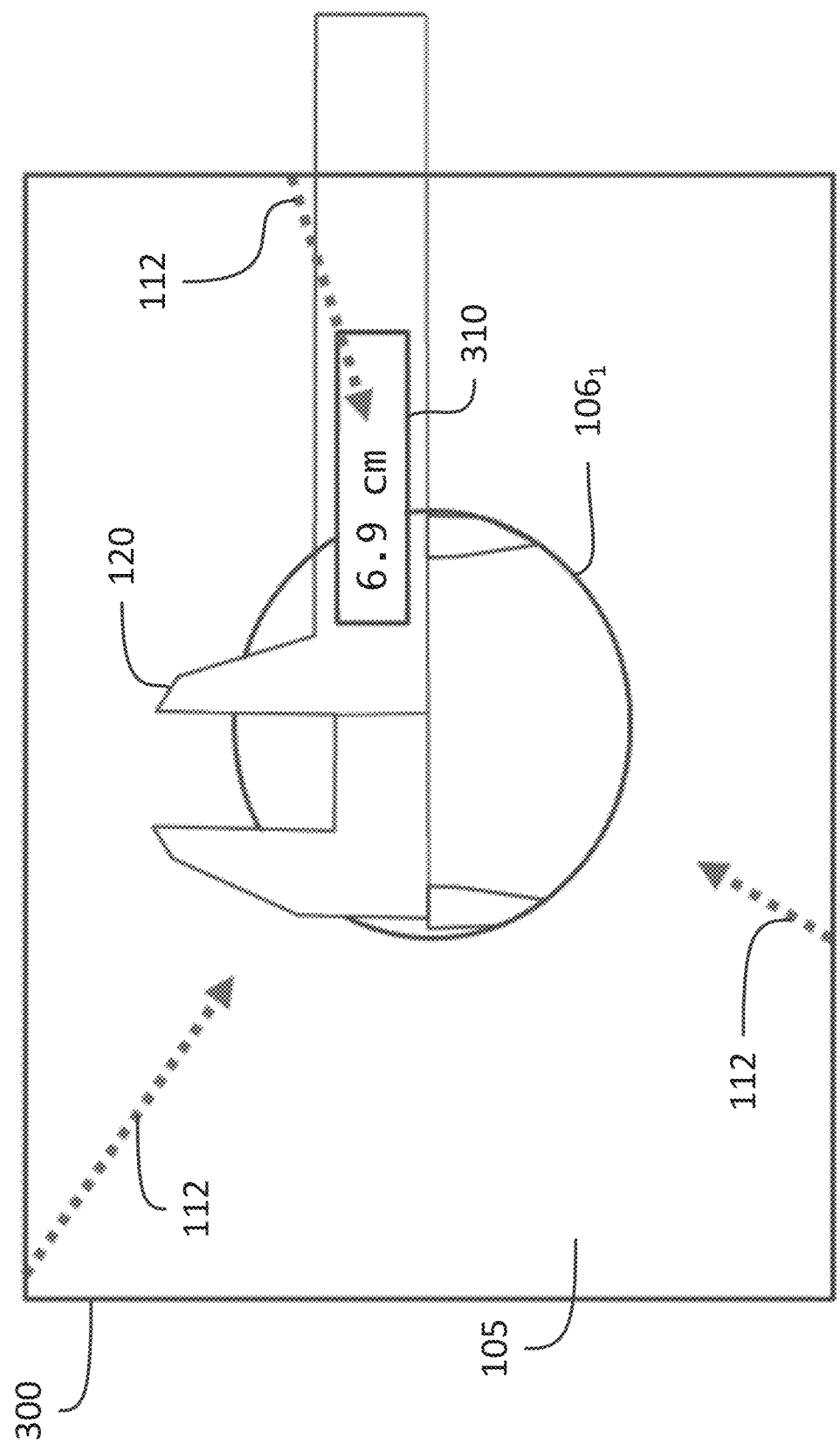
FIG. 3 is a schematic diagram of an example image produced via the inspection system of FIG. 2, in accordance with at least some embodiments.

With reference to FIG. 3, an example augmented image 300, for instance as captured by the AR device 110, is shown. The augmented image 300 includes a portion of the component 105, as well as the feature $106_1$ on which the measurement is to be performed. The augmented image 300 captures at least part of the instrument 120, including a screen 310 displaying a reading of the measurement value. As shown here, the screen 310 is a screen which produces a digital reading of the measurement value, but other types of readings, including analog readings, for instance on a scale, are also considered. In addition, the augmented image 300 captures the AR graphical elements 112, which are used to indicate to the operator 102 how the measurement is to be performed, what is to be measured, and the like. For completeness, the portion of the instrument 120 not captured in the augmented image 300 is shown, but it should be understood that the augmented image 300 needs not capture the whole of the instrument 120. For example, the image 300 can capture representations of portions of the instrument 120 used to acquire the measurement value, and which indicate the measurement value as measured by the operator 102, for instance the screen 310. Other approaches are also considered.

As noted hereinabove, the augmented image 300 can be associated with various metadata, including time of capture, location of capture, an identifier of the device and/or operator who captured the augmented image 300, and the like. The metadata can be stored with the augmented image 300, or therewithin, using any suitable techniques.

Figure 4:
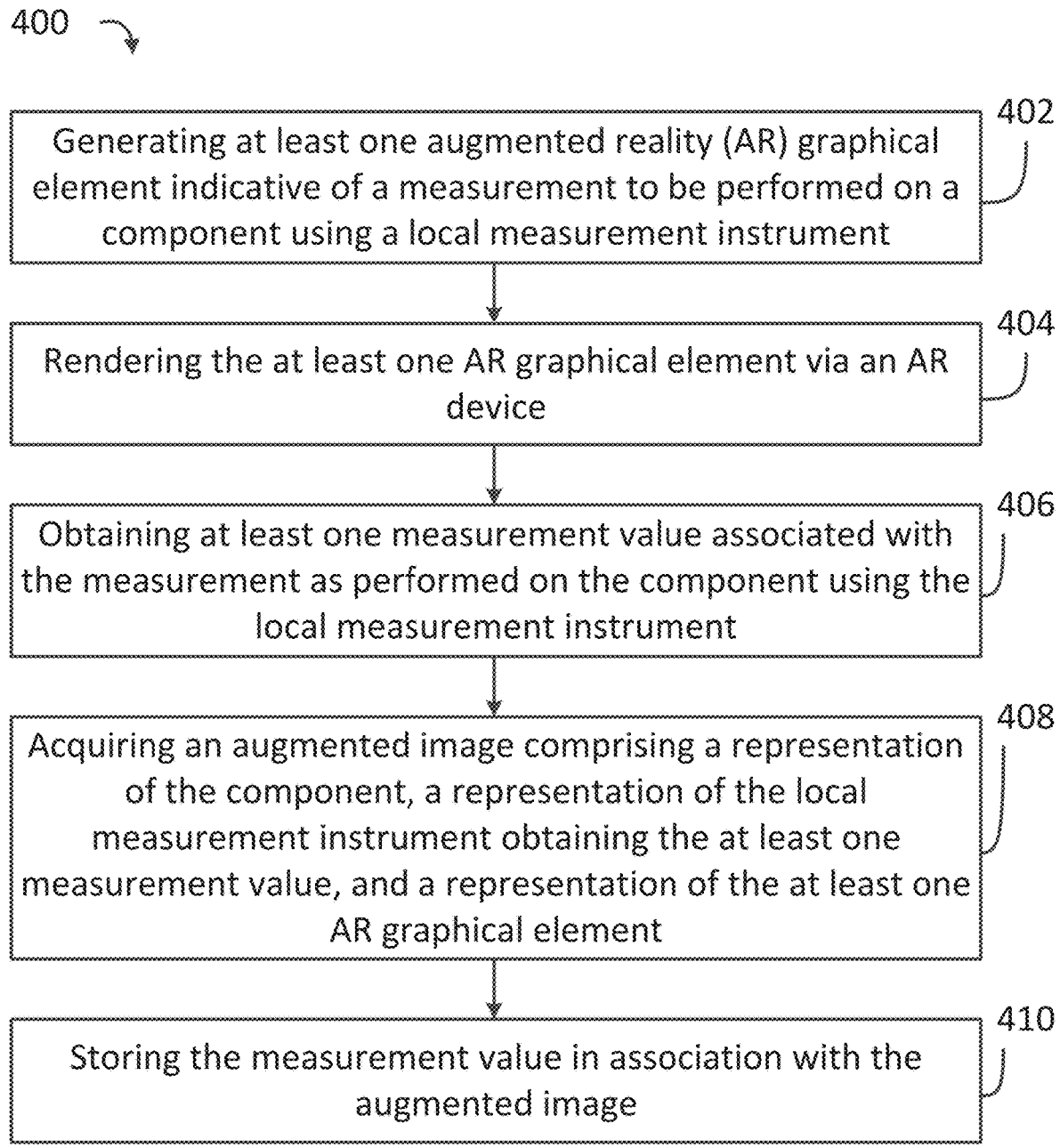
FIG. 4 is a flowchart illustrating an example method for producing a traceable measurement of a component, in accordance with at least some embodiments.

With reference to FIG. 4, a method 400 for producing a traceable measurement of a component is illustrated. At step 402, one or more AR graphical elements indicative of a measurement to be performed on a component is generated, for instance the AR graphical elements 112. The AR graphical elements 112 can include various graphics and other instructions for guiding an operator, for instance the operator 102, to perform a measurement on a component, for instance the component 105, or any one or more features 106 thereof. The AR graphical elements 112 can be generated within a computing device, for instance the computing device 130, and stored therein or in a data repository, for instance the database 132.

At step 404, the AR graphical elements 112 are rendered via an AR device, for instance the AR device 110. For example, the computing system 130 can cause the AR device 110 to display the AR graphical elements 112. The AR graphical elements 112 can be presented in response to an input from the operator 102, based on a predetermined trigger or other event, or the like.

At step 406, one or more measurement values associated with the measurement as performed by the operator 102 on the component 105 with a measurement instrument are obtained. The measurement value can be any suitable qualitative or quantitative value, and can be obtained from a measurement instrument, for instance the instrument 120, or via an input device into which the operator 102 can input the measurement value.

At step 408, an augmented image is acquired, for instance using the AR device 110. The augmented image contains a representation of the component, a representation of the local measurement instrument obtaining the at least one measurement value, and a representation of the at least one AR graphical element. The augmented image can be a still image, a plurality of images, a video segment of any suitable length, or any other suitable image data. The image can contain an indication of the measurement value, a portion of the instrument 120 with which the measurement is performed, a portion of the operator 102, where it is relevant to indicate that the operator is performing the measurement, one or more of the AR graphical elements 112 used to instruct the operator 102 how to perform the measurement, and the like. In some embodiments, the augmented image is acquired based on input from the operator 102. In some other embodiments, the augmented image is automatically acquired based on one or more triggers. In some further embodiments, the augmented image is acquired based on a combination of operator input and one or more triggers.

At step 410, the measurement value is stored in association with the augmented image, for instance in the database 132. The measurement value and associated augmented image can be stored for later retrieval, for instance to perform validation of the measurement value, to assess operator behaviour for compliance with established inspection procedures, and the like. In some embodiments, the measurement value and the augmented image are stored in association with various metadata.

The method 400 can be performed successively for various measurements on a single component 105, for instance for each of the features 106 on the component 105. In some embodiments, step 402 can be performed prior to any measurements being taken, and steps 404 through 410 can be performed repeatedly for multiple AR graphical elements 112 associated with different measurements. In some embodiments, a set of measurement values and associated augmented images can be acquired, by performing steps 404 through 408 repeatedly, and once the set is complete, step 410 can be performed for the set of measurement values and associated augmented images. Other approaches are also considered.

Figure 5:
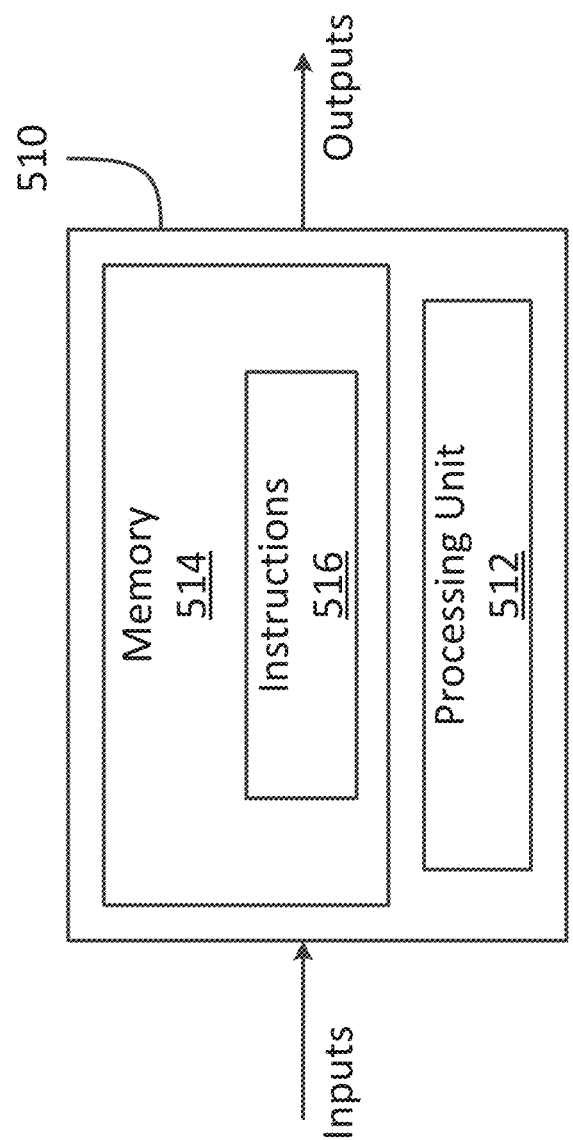
FIG. 5 is a block diagram of an example computing device for implementing the method of FIG. 4.

With reference to FIG. 5, the method 400 may be implemented by a computing device 510, which can embody part or all of the computing system 130, and optionally the database 132. The computing device 510 comprises a processing unit 512 and a memory 514 which has stored therein computer-executable instructions 516. The processing unit 512 may comprise any suitable devices configured to implement the functionality of the computing system 130, and/or the functionality described in the method 400, such that instructions 516, when executed by the computing device 510 or other programmable apparatus, may cause the functions/acts/steps performed by the computing system 130, and/or described in the method 400 as provided herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

The embodiments of the systems and methods described herein may be implemented in any suitable combination of hardware and/or software. These embodiments may be implemented on programmable computers, each computer including at least one processor, a data storage system (including volatile memory or non-volatile memory or other data storage elements or a combination thereof), and at least one communication interface. The methods and systems described herein may be implemented in a high level procedural or object oriented programming or scripting language, or a combination thereof, to communicate with or assist in the operation of a computer system, for example the computing device 510. Alternatively, or in addition, the methods and systems described herein may be implemented in assembly or machine language. The language may be a compiled or interpreted language. Embodiments of the methods and systems described herein may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the methods of the present disclosure. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for producing a traceable measurement of a component, comprising:
    generating at least one augmented reality (AR) graphical element indicative of a measurement to be performed on the component using a local measurement instrument, the generating the at least one AR graphical element comprising comparing a position and/or an orientation of the component with a virtual position and/or a virtual orientation associated with a virtual representation of the component;
    rendering the at least one AR graphical element via an AR device;
    obtaining at least one measurement value associated with the measurement as performed on the component using the local measurement instrument;
    capturing an augmented image comprising a representation of the component, a representation of the local measurement instrument obtaining the at least one measurement value, and the at least one AR graphical element; and
    storing the measurement value in association with the augmented image.

2. The method of claim 1, wherein the at least one AR graphical element is indicative of a measuring position and/or a measuring orientation for the local measurement instrument relative to the component.

3. The method of claim 1, wherein obtaining the at least one measurement value comprises obtaining the at least one measurement value from the local measurement instrument.

4. The method of claim 1, wherein obtaining the at least one measurement value comprises obtaining the at least one measurement value via an input device independent from the local measurement instrument.

5. The method of claim 1, wherein capturing the augmented image comprises:
    monitoring a video feed obtained from the AR device configured for generating the at least one AR graphical element; and
    capturing the augmented image when the local measurement instrument is located in a field of view of the AR device.

6. The method of claim 5, wherein capturing the augmented image when the measurement instrument is located in a field of view of the AR device comprises capturing the image based on an input from an operator.

7. The method of claim 1, wherein the rendering of the at least one AR graphical element via the AR device is performed responsive to determining that the position and/or orientation of the component corresponds to the virtual position and/or virtual orientation within a predetermined threshold.

8. The method of claim 1, wherein the virtual position and/or the virtual orientation is determined based on at least one target located on the component.

9. The method of claim 1, wherein the virtual position and/or the virtual orientation is adjustable in response to input from an operator.

10. A system for producing a traceable measurement of a component, comprising:
    a processor; and
    a non-transitory computer-readable medium having stored thereon instructions executable by the processor for:
        generating at least one augmented reality (AR) graphical element indicative of a measurement to be performed on the component using a local measurement instrument, the generating the at least one AR graphical element comprising comparing a position and/or an orientation of the component with a virtual position and/or a virtual orientation associated with a virtual representation of the component;
        rendering the at least one AR graphical element via an AR device;
        obtaining at least one measurement value associated with the measurement as performed on the component using the local measurement instrument;
        capturing an augmented image comprising a representation of the component, a representation of the local measurement instrument obtaining the at least one measurement value, and the at least one AR graphical element; and
        storing the measurement value in association with the augmented image.

11. The system of claim 10, wherein the at least one AR graphical element is indicative of a measuring position and/or a measuring orientation for the local measurement instrument relative to the component.

12. The system of claim 10, wherein obtaining the at least one measurement value comprises obtaining the at least one measurement value from the local measurement instrument.

13. The system of claim 10, wherein obtaining the at least one measurement value comprises obtaining the at least one measurement value via an input device independent from the local measurement instrument.

14. The system of claim 10, wherein capturing the augmented image comprises:
    monitoring a video feed obtained from the AR device configured for generating the at least one AR graphical element; and
    capturing the augmented image when the local measurement instrument is located in a field of view of the AR device.

15. The system of claim 14, wherein capturing the augmented image when the measurement instrument is located in a field of view of the AR device comprises capturing the image based on an input from an operator.

16. The system of claim 10, wherein the rendering of the at least one AR graphical element via the AR device is performed responsive to determining that the position and/or orientation of the component corresponds to the virtual position and/or virtual orientation within a predetermined threshold.

17. The system of claim 10, wherein the virtual position and/or the virtual orientation is determined based on at least one target located on the component.

18. The system of claim 10, wherein the virtual position and/or the virtual orientation is adjustable in response to input from an operator.

\* \* \* \* \*